US009545939B1

(12) United States Patent
Wight et al.

(10) Patent No.: US 9,545,939 B1
(45) Date of Patent: Jan. 17, 2017

(54) COLLAPSIBLE STROLLER

(71) Applicant: Helen of Troy Limited, Belleville, St. Michael (BB)

(72) Inventors: David C. Wight, West Orange, NJ (US); Thomas C. Hanson, New York, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 0 days.

(21) Appl. No.: 14/874,798

(22) Filed: Oct. 5, 2015

(51) Int. Cl.
*B62B 7/06* (2006.01)
*B62B 7/08* (2006.01)

(52) U.S. Cl.
CPC ............... *B62B 7/086* (2013.01); *B62B 7/066* (2013.01)

(58) Field of Classification Search
CPC ............ B62B 7/062–7/066; B62B 7/08–7/086
See application file for complete search history.

(56) References Cited

U.S. PATENT DOCUMENTS 5,709,400 A * 1/1998 Bonnier .................... B62B 7/08
280/47.38

* cited by examiner

*Primary Examiner* — Erez Gurari
(74) *Attorney, Agent, or Firm* — Rankin, Hill & Clark LLP

(57) ABSTRACT

A collapsible stroller includes a stroller frame moveable between a deployed position and a collapsed position and a latch mechanism. The stroller frame includes a first leg, a second leg and a handle support member. The handle support member is pivotable with respect to the first leg or the second leg. The latch mechanism includes a latch body and a catch. The latch body is positioned internally of the second leg. When the stroller is in the deployed position, the latch body is blocked from view by the second leg when the stroller frame is viewed in a side elevation view. The catch is provided on or connected with the first leg or the handle support member. The latch body cooperates with the catch to selectively connect the latch body with the catch when the stroller is in the collapsed position.

17 Claims, 5 Drawing Sheets

COLLAPSIBLE STROLLER

BACKGROUND

The present disclosure is generally related to collapsible strollers. Many strollers collapse, i.e., move between a deployed position and a collapsed position, by folding about a hinge mechanism connecting a handle of the stroller to a leg of the stroller.

Strollers that move between a deployed position and a collapsed position often include some sort of latch mechanism to maintain the stroller in the collapsed position. The latch mechanism often connects a leg of the stroller frame to a handle support. These latch mechanisms are often very noticeable when the stroller is in the deployed position, which can be unattractive

SUMMARY

In view of the foregoing, a collapsible stroller includes a stroller frame moveable between a deployed position and a collapsed position and a latch mechanism on the frame. The stroller frame includes a first leg, a second leg and a handle support member connected with the first leg or the second leg. The second leg is connected with and movable with respect to the first leg between a first position and a second position. The handle support member is pivotable with respect to the first leg or the second leg. The latch mechanism includes a latch body and a catch. The latch body is positioned internally of the second leg such that when the stroller is in the deployed position, the latch body is blocked from view by the second leg when the stroller frame is viewed in a side elevation view. The catch is provided on or connected with the first leg or the handle support member so as to be moveable with the first leg or the handle support member. The latch body cooperates with the catch to selectively connect the latch body with the catch when the stroller is in the collapsed position to maintain the stroller in the collapsed position.

DETAILED DESCRIPTION

Figure 1:
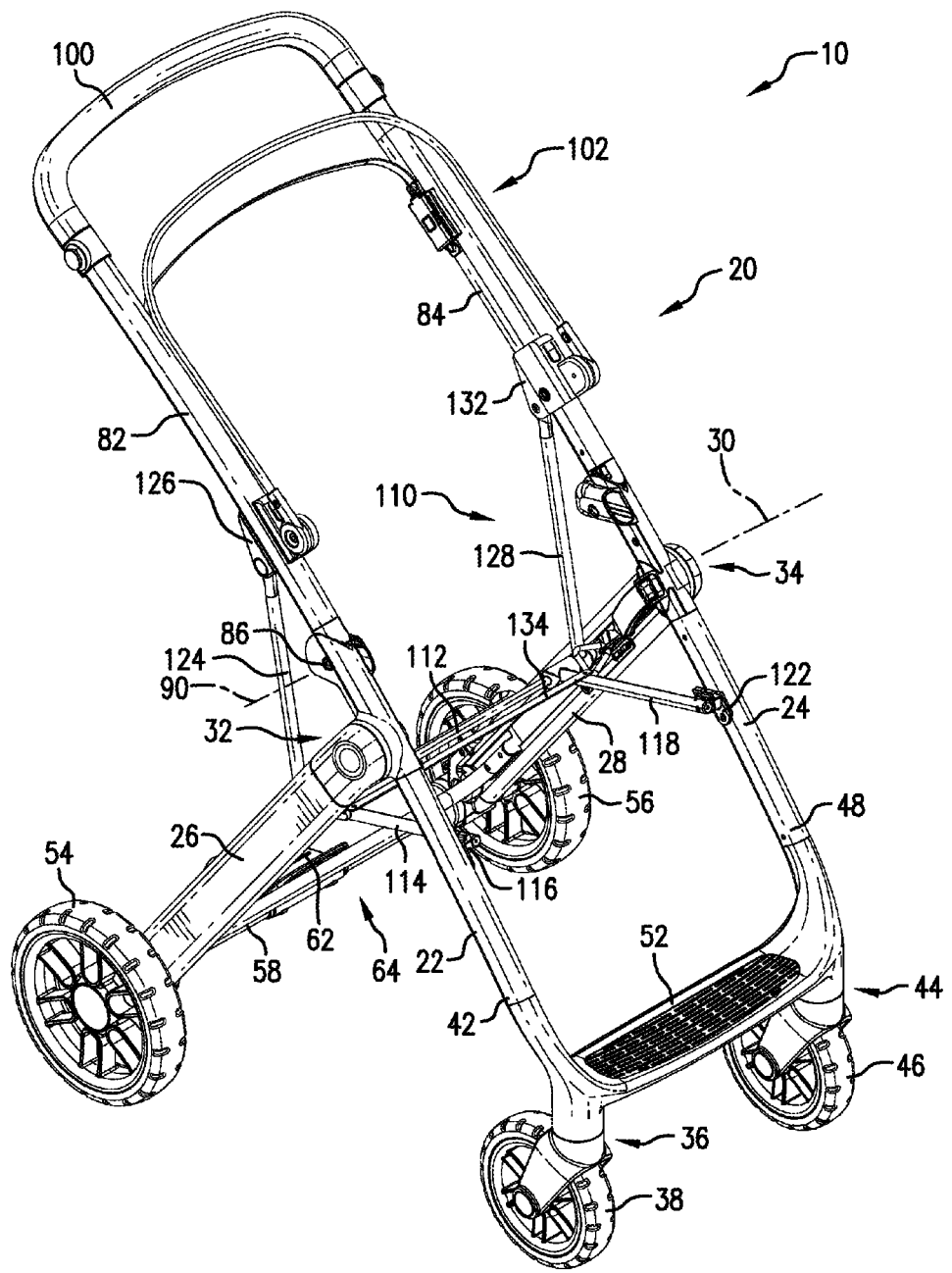
FIG. 1 is a front perspective view of a stroller frame in a deployed position.
Figure 2:
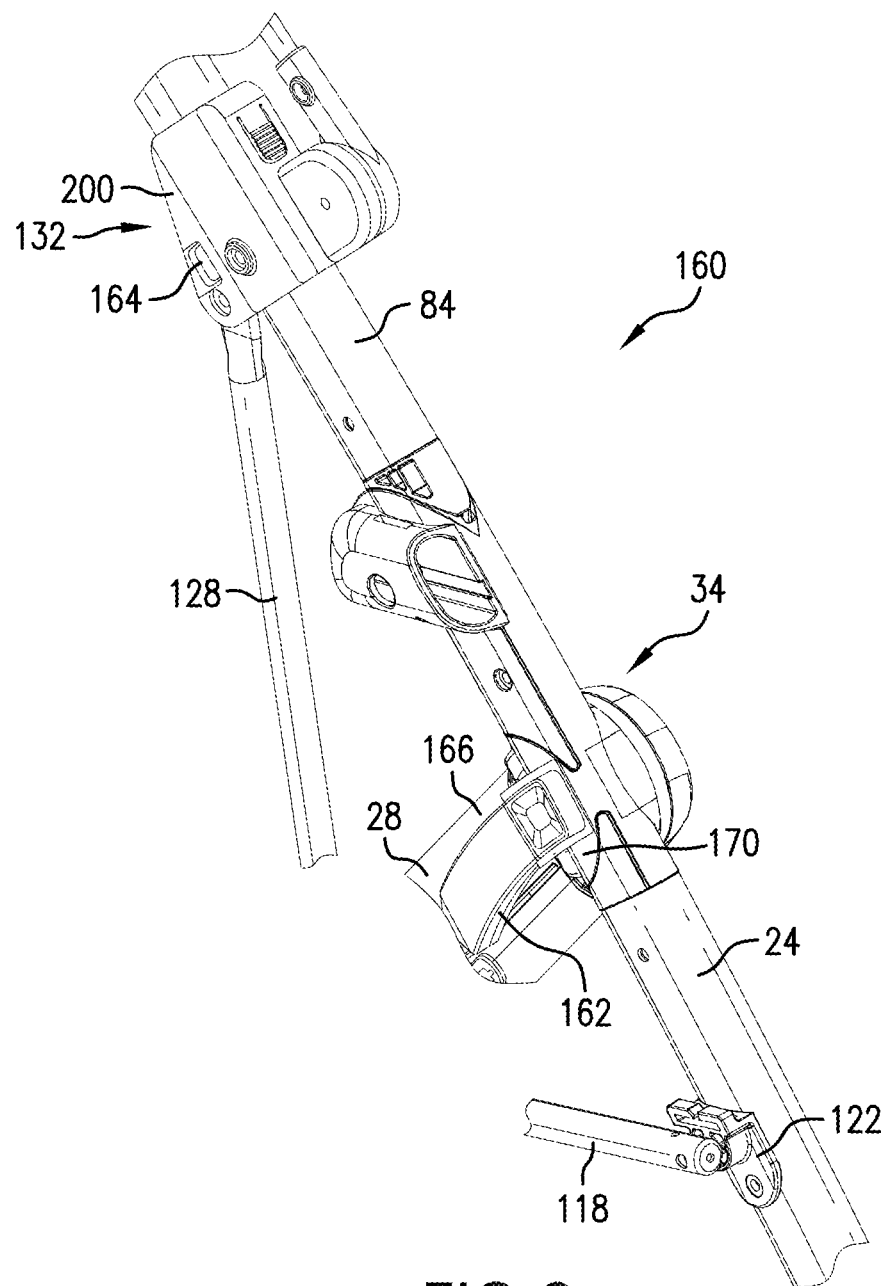
FIG. 2 is a close-up perspective view of the stroller frame in the deployed position showing a latch mechanism.
Figure 3:
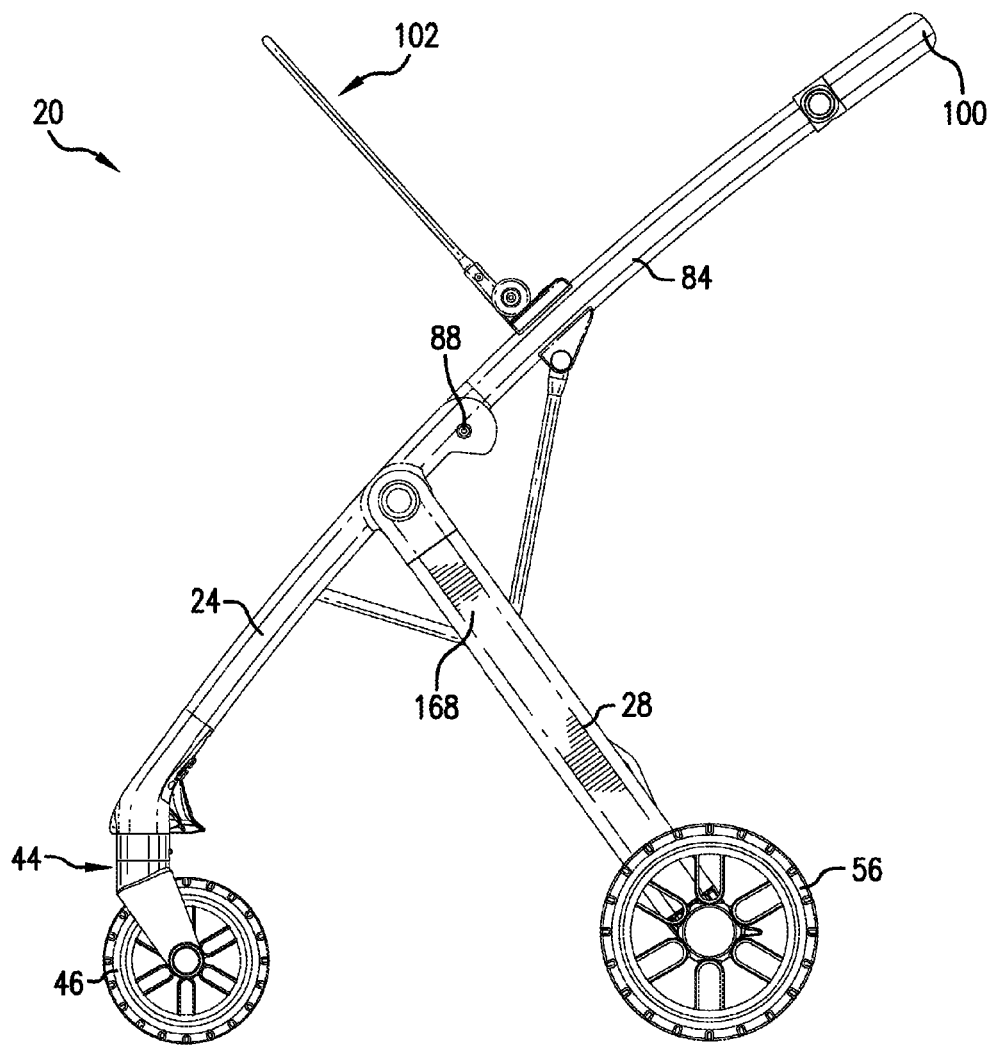
FIG. 3 is a side elevation view of the stroller frame in the deployed position.
Figure 4:
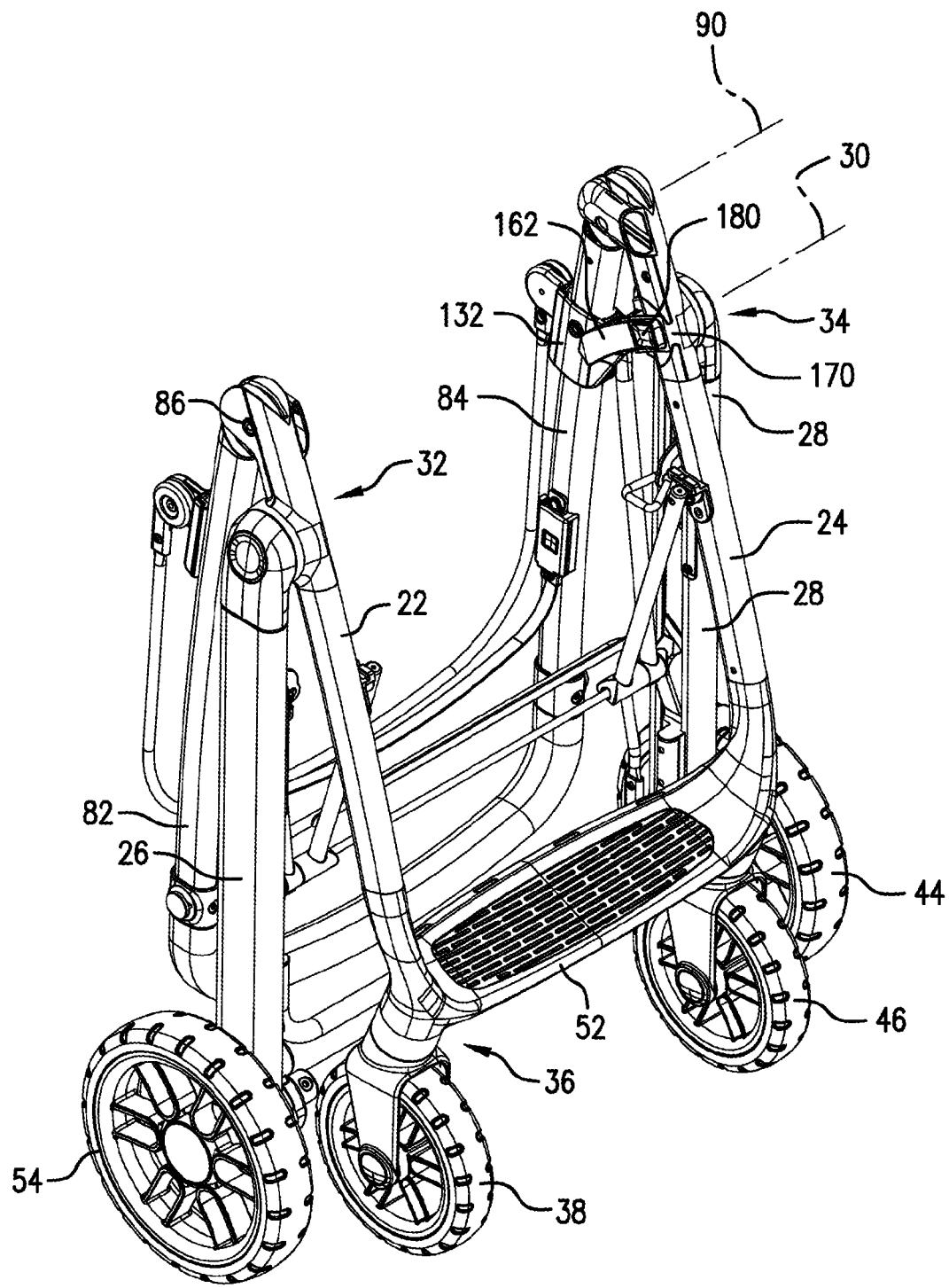
FIG. 4 is a perspective view of the stroller frame in a collapsed position.

With reference to FIG. 1, a stroller 10 includes soft goods that can include a seat (not shown), a canopy (not shown) and a basket (not shown). The stroller 10 further includes a stroller frame 20 that supports the soft goods. The soft goods can vary considerably in configuration and are not shown in detail to provide more clarity to the drawings. The stroller frame 20 (as well as the stroller 10) is moveable between a deployed position, which is shown in FIGS. 1-3, and a collapsed position, which is shown in FIG. 4.

The stroller frame 20 includes a front right leg 22 and a front left leg 24, which can be referred to as first legs. The stroller frame 20 also includes a rear right leg 26 and a rear left leg 28, which can be referred to as second legs. The front legs 22, 24 can pivot with respect to the rear legs 26, 28 about a leg collapse axis 30. The front right leg 22 connects with the rear right leg 26 at a right hinge mechanism 32. The front left leg 24 and the rear left leg 28 connect at a left hinge mechanism 34. The hinge mechanisms 32, 34 on the stroller frame 20 allow for movement of the stroller frame 20 between the collapsed position (shown in FIG. 4) and the deployed position (shown in FIGS. 1-3).

A right swivel mechanism 36 connects a front right wheel 38 to the stroller frame 20 adjacent a lower end 42 of the front right leg 22. Similarly, a left swivel mechanism 44 connects a front left wheel 46 to the stroller frame 20 adjacent a lower end 48 of the front left leg 24. A foot rest 52 attaches to the lower end 42 of the front right leg 22 and to the lower end 48 of the front left leg 24.

A rear right wheel 54 connects with the rear right leg 26 at an end opposite the right hinge mechanism 32. A rear left wheel 56 connects with the rear left leg 28 at an end opposite the left hinge mechanism 34. A rear transverse support 58 connects the rear right wheel 54 and the rear left wheel 56. An actuator pedal 62 can be provided on the rear transverse support 58 to actuate a break mechanism (not shown in detail in FIG. 1), which can be conventional, to prevent the rear wheels 54, 56 from rolling. A basket support frame assembly 64 can connect with the rear legs 26, 28 and provide support for a basket, which is part of the aforementioned soft goods.

A right handle support member 82 connects with the front right leg 22 and is pivotable with respect to the front right leg 22 between an upright position, which is shown in FIG. 1, and a folded position, which is shown in FIG. 4. A left handle support member 84 connects with the front left leg 24 and is also pivotable with respect to the front left leg 24 between the upright position and the folded position. Axles 86, 88 (see also FIG. 3) connect the right handle support member 82 with the front right leg 22 and the left handle support member 84 with the front left leg 24, respectively. The axles 86, 88 are centered along a handle collapse axis 90. A handle 100, which is used to maneuver the stroller 10, connects with the handle support members 82, 84. A canopy support frame assembly 102 also connects with the handle support members 82, 84. The canopy support frame assembly 102 is provided to support the canopy, which is also part of the aforementioned soft goods.

A seat frame assembly 110 also connects with the stroller frame 20. The seat frame assembly 110 includes a main transverse support member 112 that connects with the rear right leg 26 and the rear left leg 28. A front right support member 114 connects with the main transverse support member 112 and the front right leg 22. A front right bracket 116 is provided to connect the front right support member 114 with the front right leg 22. A front left support member 118 connects the main transverse support member 112 with the front left leg 24 through a front left bracket 122. A rear right support member 124 connects the main transverse support member 112 with the right handle support member 82. A rear right bracket 126 is provided to connect the rear right support member 124 with the right handle support member 82. A rear left support member 128 connects with the main transverse support member 112 and with the left handle support member 84 through a rear left bracket 132. A secondary transverse support member 134 connects the front right support member 114 with the front left support member 118.

The stroller 10 further includes a hinge lock mechanism, which is hidden from view by the rear right leg 26, capable of a locked state and an unlocked state. In the locked state, the hinge lock mechanism locks the hinge mechanisms 32, 34 to maintain the stroller frame 20 in the deployed position. While in the locked state, the hinge lock mechanism also precludes pivotal movement of the handle support members 82, 84 with respect to the front legs 22, 24. In the unlocked state, the hinge lock mechanism allows the stroller frame 20 to move from the deployed position toward the collapsed position.

FIG. 2 depicts a latch mechanism 160 on the stroller frame 20 including a latch body 162 and a catch 164. The latch body 162 is positioned internally of at least one leg, which in the illustrated embodiment is the rear left leg 28. The catch 164 is provided on or connected with the left handle support member 84. The latch body 162 cooperates with the catch 164 to selectively connect the latch body 162 with the catch 164 when the stroller is in the collapsed position (see FIG. 4) to maintain the handle support member 84 in the folded position.

As illustrated, the latch body 162 is positioned internally of the rear left leg 28 such that when the stroller is in the deployed position (see FIG. 3), the latch body 162 is blocked from view when the stroller frame 20 is viewed in a side elevation view. The rear left leg 28 has an internal side 166, which faces internally toward the seat frame assembly 110, and an external side 168, which faces away from the seat frame assembly 110. In the illustrated embodiment, the latch body 162 mounts to a hinge mechanism housing 170, which makes up part of the left hinge mechanism 34, adjacent to the internal side 166 of the rear left leg 28. When viewed normal to the external side 168 of the rear left leg 28, the latch body 162 is hidden from view by the rear left leg 28. FIG. 3 depicts a side elevation view of the stroller frame 20, and as is apparent, the latch body 162 is hidden by the rear left leg 28. Moreover, when viewed from the right side of the stroller frame 20, the rear right leg 26 also blocks the view of the latch body 162 when the stroller frame 20 is viewed in the right side elevation view. Also, when the seat (not shown, part of the aforementioned soft goods) is attached to the seat frame assembly 110, the latch body 162 is even further obscured when the stroller frame 20 is in the deployed position.

At least one leg of the stroller frame 20 is pivotable with respect to the latch body 162. As seen when comparing FIG. 3 to FIG. 4, in the illustrated embodiment the rear left leg 28 is pivotable with respect to the latch body 162. The rear left leg 28 pivots with respect to the latch body 162 about the leg collapse axis 30. The handle support member 84 pivots with respect to the front left leg 24 about the handle collapse axis 90, which is parallel with and offset from the leg collapse axis 30. The rear left leg 28 pivots with respect to the latch body 162 about the leg collapse axis 30 when the stroller frame 20 is moving between the deployed position (shown in FIGS. 1 and 3) and the collapsed position (shown in FIG. 4).

The rear left leg 28 pivots with respect to the front left leg 24 about the leg collapse axis 30, but the latch body 162 does not rotate with respect to the front left leg 24 about an axis parallel with the leg collapse axis 30. Instead, the latch body 162 is rotationally fixed with respect to the front left leg 24 in an axis parallel with the leg collapse axis 30 so as to move along with the front left leg 24 as the front left leg 24 moves or rotates about the axis parallel with the leg collapse axis 30. This can allow the catch 164 to move toward the latch body 162 when the left handle support member 84 is moved from the upright position (shown in FIG. 1) toward the folded position (shown in FIG. 4). As discussed above, the left axle 88 connects the left handle support member 84 with the front left leg 24. The front left leg 24 pivots with respect to the rear left leg 28 about the leg collapse axis 30, which intersects the left hinge mechanism 34. The left handle support member 84 pivots with respect to the front left leg 24 about the handle collapse axis 90, which is parallel with and offset from the leg collapse axis 30, which extends through the left axle 88. As the stroller frame 20 moves from the deployed position toward the collapsed position, the left handle support member 84 and the rear left leg 28 move with respect to the latch body 162 while the orientation of the latch body 162 about the leg collapse axis 30 remains fixed with respect to the front left leg 24.

Figure 5:
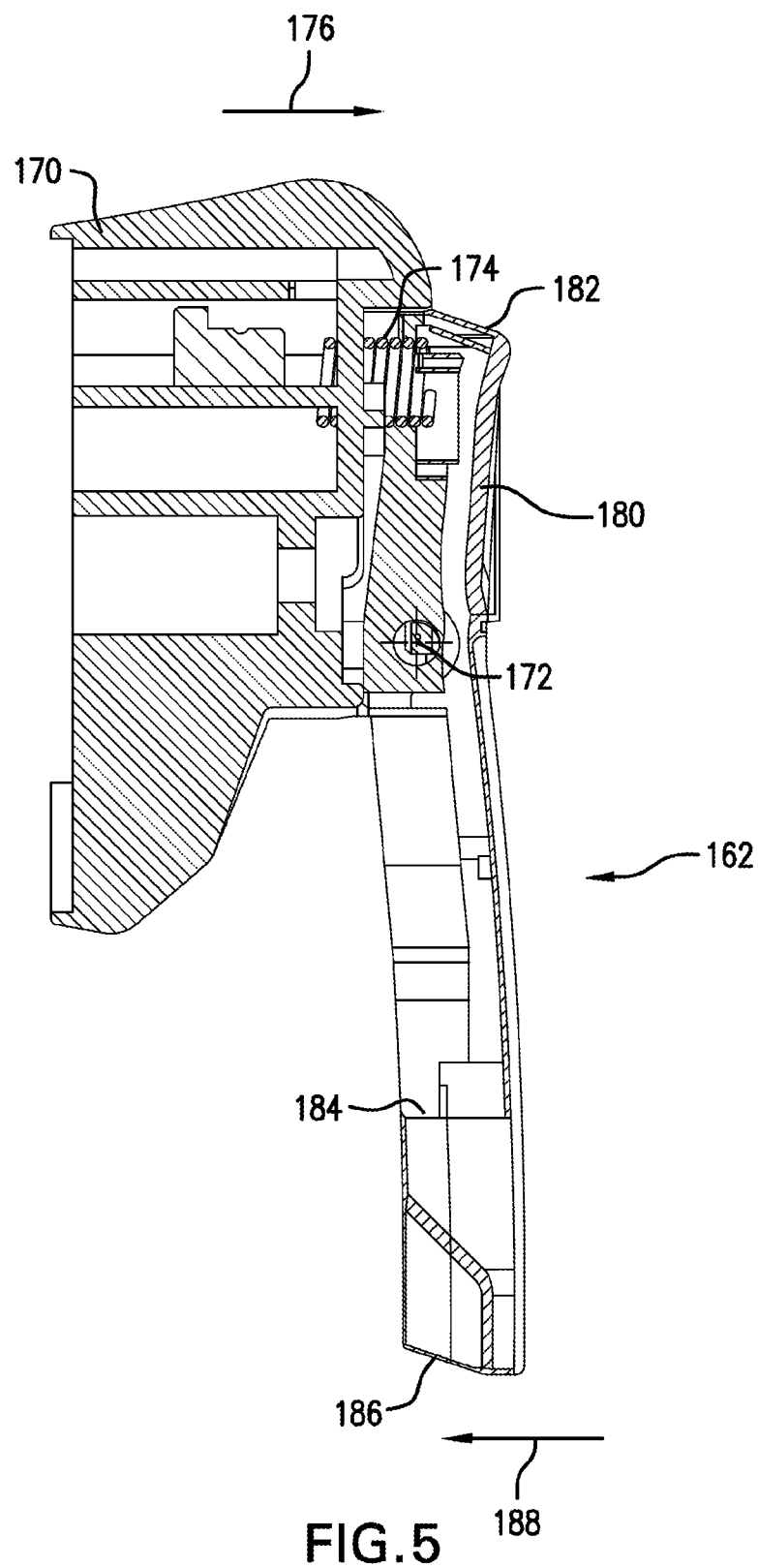
FIG. 5 is a cross-sectional view taken through a latch body of the latch mechanism and through a portion of a hinge mechanism.

FIG. 5 depicts the latch body 162 connected with the hinge mechanism housing 170, which makes up part of the left hinge mechanism 34. The rear left leg 28 pivots with respect to the latch body 162 about the leg collapse axis 30. The latch body 162 pivots with respect to the rear left leg 28 about a latch body pivot axis 172, which is shown in FIG. 5. The leg collapse axis 30 (FIGS. 1 and 4) is perpendicular to the latch body pivot axis 172. The latch body 162 connects with the hinge mechanism housing 170 via a fastener or axle (not shown) that is centered on the latch body pivot axis 172.

With continued reference to FIG. 5, a compression spring 174 contacts the hinge mechanism housing 170 and the latch body 162. The latch body 162 is biased in a direction perpendicular to the latch body pivot axis 172 and a general direction of arrow 176 by the compression spring 174.

The latch body 162 includes a button section 180 adjacent a first end 182 of the latch body 162 and a catch engaging portion 184 positioned nearer to a second end 186 of the latch body 162 as compared to the first end 182. The catch engaging portion 184 contacts the catch 164 when the stroller frame 20 is in the collapsed position (FIG. 4). The button section 180 is biased in a first direction (in the direction of arrow 176) perpendicular to the latch body pivot axis 172. With the button section 180 biased in the first direction, this urges the catch engaging portion 184 in a second direction (in the direction of arrow 188) which is opposite to the first direction (in the direction of arrow 176).

With reference back to FIG. 2, the catch 164 in the illustrated embodiment is a bump. With reference back to FIG. 5, the catch engaging portion 184 includes a ledge. The second end 186 of the latch body 162 moves in the first direction (in the direction of arrow 176) when riding over the bump (catch 164) when the stroller frame 20 is moving from the deployed position toward the collapsed position. The button section 180 is configured to be depressed in the second direction (in the direction of arrow 188) when the catch engaging portion 184 is engaged with the catch 164 with the stroller frame in the collapsed position to disconnect the latch body 162 with the catch 164. Even though the catch 164 is shown as a bump and the catch engaging portion 184 is shown as a ledge, these could be changed where the catch is a recess and the catch engaging portion is a bump or projection.

As discussed above, the catch 164 is provided on or connected with the left handle support member 84. In the illustrated embodiment, the catch 164 is provided on the rear left bracket 132, which is connected with the left handle support member 84. The catch 164 is provided on an inner surface 200 of the rear left bracket 132. The inner surface 200 faces inward toward the seat frame assembly 110. When the stroller frame 20 is in the deployed position (see FIG. 3), the catch 164 is blocked from view when the stroller frame 20 is viewed in a side elevation view, such as that shown in FIG. 3.

The latch mechanism 160 on the stroller frame 20 maintains the handle support members 82, 84 in the folded position when the stroller frame 20 is in the collapsed position shown in FIG. 4. Both the latch body 162 and the catch 164 are not visible when viewed in a side elevation view, such as that shown in FIG. 3. With reference to FIG. 3, the rear left leg 28 blocks the latch body 162 from view. However, when the stroller frame 20 is moved to the collapsed position, which is shown in FIG. 4, the latch body 162, and more particularly the button section 180, is visibly noticeable to an operator of the stroller 10. As such, the main components of the latch mechanism 160 are hidden from view, especially a side elevation view such as that shown in FIG. 3, when the stroller frame is in the deployed position, but the latch body 162 is noticeable and accessible when the stroller frame 20 is in the collapsed position.

In an alternative arrangement, a catch (similar to the catch 164) could be provided elsewhere on the stroller frame 20. For example, a catch similar to the catch 164 could be provided on the front left leg 24 and the latch body 162 of the latch mechanism 160 could be positioned internally of the rear left leg 28 and angle towards the front left leg 24 when the stroller 10 is in the collapsed position. The latch body 162 could still be positioned internally of the rear left leg 28 such that when the stroller frame 20 is in the deployed position the latch body 162 is blocked from view by the rear left leg 28 when the stroller frame 20 is viewed in a side elevation view. The latch mechanism 160 in this alternative arrangement would maintain the position of the front left leg 24 with respect to the position of the rear left leg 28 when the stroller frame 20 is in the collapsed position.

A collapsible stroller and a method for collapsing the stroller have been described above with particularity. Directional terms, such as, top, bottom, left, right, up, down, over, above, below, beneath, rear, and front are used with respect to the accompanying drawings. Such directional terms should not be construed to limit the scope of the invention in any manner. Modifications and alterations will occur to those upon reading and understanding the preceding detailed description. The invention, however, is not limited to only the embodiments described above. Instead, the invention is broadly defined by the appended claims and the equivalents thereof. Also various presently unforeseen or unanticipated alternatives, modifications, variations or improvements therein may be subsequently made by those skilled in the art which are also intended to be encompassed by the following claims.

The invention claimed is:

1. A collapsible stroller comprising:
 a stroller frame movable between a deployed position and a collapsed position, the stroller frame comprising
  a first leg;
  a second leg connected with and movable with respect to the first leg between a first position and a second position; and
  a handle support member connected with the first leg or the second leg and pivotable with respect to the first leg or the second leg; and
 a latch mechanism on the stroller frame, the latch mechanism comprising
  a latch body positioned internally of the second leg such that when the stroller frame is in the deployed position the latch body is blocked from view by the second leg when the stroller frame is viewed in a side elevation view, wherein the second leg is pivotable with respect to the latch body, wherein the second leg pivots with respect to the latch body about a leg collapse axis and the handle support member pivots with respect to the first leg about a handle collapse axis, which is parallel with and offset from the leg collapse axis, between an upright position and a folded position; and
  a catch provided on or connected with the first leg or the handle support member so as to be movable with the first leg or the handle support member, wherein the latch body cooperates with the catch to selectively connect the latch body with the catch when the stroller frame is in the collapsed position to maintain the stroller frame in the collapsed position.

2. The stroller of claim 1, wherein the second leg pivots with respect to the latch body about the leg collapse axis when the stroller frame is moving between the deployed position and the collapsed position, and the catch connects with the latch body when the handle support member is in the folded position.

3. A collapsible stroller comprising:
 a stroller frame movable between a deployed position and a collapsed position, the stroller frame comprising
  a front leg;
  a rear leg connected with and movable with respect to the front leg between a first position and a second position; and
  a handle support member connected with the front leg or the rear leg and pivotable with respect to the front leg or the rear leg;
 a hinge mechanism connecting the rear leg with the front leg such that the rear leg pivots with respect to the front leg;
 an axle connecting the handle support member with the front leg; and
 a latch mechanism on the stroller frame, the latch mechanism comprising
  a latch body positioned internally of the rear leg such that when the stroller frame is in the deployed position the latch body is blocked from view by the rear leg when the stroller frame is viewed in a side elevation view;
  a catch provided on or connected with the front leg or the handle support member so as to be movable with the front leg or the handle support member, wherein the latch body cooperates with the catch to selectively connect the latch body with the catch when the stroller frame is in the collapsed position to maintain the stroller frame in the collapsed position,
 wherein the front leg pivots with respect to the rear leg about a leg collapse axis intersecting the hinge mechanism, and the handle support member pivots with respect to the front leg about a handle collapse axis, which is parallel with and offset from the leg collapse axis, extending through the axle.

4. The stroller of claim 3, wherein the latch body is positioned internally of the rear leg such that when the stroller frame is in the deployed position the latch body is blocked from view by the rear leg when the stroller frame is viewed in the side elevation view.

5. The stroller of claim 4, wherein the stroller frame further includes a seat frame assembly, wherein the rear leg has an internal side, which faces internally toward the seat frame assembly, and an external side, which faces away from the seat frame assembly, and the latch body mounts adjacent to the internal side of the rear leg.

6. The stroller of claim 5, wherein the latch body mounts to a hinge mechanism housing, which is part of the hinge mechanism.

7. The stroller of claim 3, wherein the rear leg pivots with respect to the front leg about a leg collapse axis and the latch body does not rotate with respect to the front leg about an axis parallel with leg collapse axis.

8. A collapsible stroller comprising:
a stroller frame movable between a deployed position and a collapsed position, the stroller frame comprising
a first leg;
a second leg connected with and movable with respect to the first leg between a first position and a second position; and
a handle support member connected with the first leg or the second leg and pivotable with respect to the first leg or the second leg; and
a latch mechanism on the stroller frame, the latch mechanism comprising
a latch body positioned internally of the second leg such that when the stroller frame is in the deployed position the latch body is blocked from view by the second leg when the stroller frame is viewed in a side elevation view; and
a catch provided on or connected with the first leg or the handle support member so as to be movable with the first leg or the handle support member, wherein the latch body cooperates with the catch to selectively connect the latch body with the catch when the stroller frame is in the collapsed position to maintain the stroller frame in the collapsed position,
wherein the second leg pivots with respect to the latch body about a leg collapse axis and the latch body pivots with respect to the second leg about a latch body pivot axis, wherein the leg collapse axis is perpendicular to the latch body pivot axis.

9. The stroller of claim 8, wherein the latch body is biased in direction perpendicular to the latch body pivot axis.

10. The stroller of claim 9, wherein the latch body includes a button section adjacent a first end of the latch body and a catch engaging portion positioned nearer to a second end of the latch body, wherein the first end is opposite the second end, and the catch engaging portion contacts the catch when the stroller frame is in the collapsed position.

11. The stroller of claim 10, wherein the button section is biased in a first direction perpendicular to the latch body pivot axis, which urges the catch engaging portion in a second direction, which is opposite to the first direction.

12. The stroller of claim 11, wherein the catch is a bump and the catch engaging portion includes a ledge, wherein the second end of the latch body moves in the first direction when riding over the bump when the stroller frame is moving from the deployed position toward the collapsed position.

13. The stroller of claim 11, wherein the button section is configured to be depressed in the second direction when the catch engaging portion is engaged with the catch with the stroller frame in the collapsed position to disconnect the latch body with the catch.

14. A collapsible stroller comprising:
a stroller frame movable between a deployed position and a collapsed position, the stroller frame comprising
a first leg;
a second leg connected with and movable with respect to the first leg between a first position and a second position; and
a handle support member connected with the first leg or the second leg and pivotable with respect to the first leg or the second leg; and
a latch mechanism on the stroller frame, the latch mechanism comprising
a latch body positioned internally of the second leg such that when the stroller frame is in the deployed position the latch body is blocked from view by the second leg when the stroller frame is viewed in a side elevation view, wherein the latch body includes a ledge; and
a catch provided on or connected with the first leg or the handle support member so as to be movable with the first leg or the handle support member, wherein the latch body cooperates with the catch to selectively connect the latch body with the catch when the stroller frame is in the collapsed position to maintain the stroller frame in the collapsed position, wherein the catch is a bump.

15. The stroller of claim 14, further comprising a bracket connected with the handle support member, wherein the catch is provided on the bracket.

16. The stroller of claim 15, wherein the catch is provided on an inner surface of the bracket such that when the stroller frame is in the deployed position the catch is blocked from view when the stroller frame is viewed in the side elevation view.

17. The stroller of claim 16, wherein the stroller frame further includes a seat frame assembly and the inner surface faces toward the seat frame assembly.

* * * * *